US012347982B2

(12) United States Patent
Liang

(10) Patent No.: US 12,347,982 B2
(45) Date of Patent: Jul. 1, 2025

(54) FAN MODULE, ELECTRICAL DEVICE HAVING CONNECTOR RESTRICTING CONFIGURATION, AND A RESTRICTING FRAME

(71) Applicant: ACCTON TECHNOLOGY CORPORATION, Hsinchu (TW)

(72) Inventor: Ta-Chu Liang, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 463 days.

(21) Appl. No.: 17/947,638

(22) Filed: Sep. 19, 2022

(65) Prior Publication Data

US 2023/0178942 A1 Jun. 8, 2023

(30) Foreign Application Priority Data

Dec. 2, 2021 (CN) ......................... 202123000830.9

(51) Int. Cl.
*H01R 13/74* (2006.01)
*F04D 25/06* (2006.01)
*F04D 29/52* (2006.01)

(52) U.S. Cl.
CPC ......... *H01R 13/74* (2013.01); *F04D 25/0693* (2013.01); *F04D 29/522* (2013.01)

(58) Field of Classification Search
CPC .... H01R 13/74; F04D 25/0693; F04D 29/522
See application file for complete search history.

(56) References Cited

U.S. PATENT DOCUMENTS

| | | | | |
|---|---|---|---|---|
| 4,741,590 A * | 5/1988 | Caron | G02B 6/3878 | 385/60 |
| 6,146,191 A * | 11/2000 | Kerr, Jr. | H02G 3/123 | 439/537 |
| 6,447,022 B1 * | 9/2002 | Allen | F16L 37/144 | 285/305 |
| 6,503,099 B2 * | 1/2003 | Kerr, Jr. | F21V 21/02 | 439/537 |
| 6,761,540 B2 * | 7/2004 | Tseng | F04D 29/601 | 439/537 |
| 6,780,049 B1 * | 8/2004 | D'Angelo | F04D 29/601 | 439/537 |

(Continued)

*Primary Examiner* — Harshad C Patel

(74) *Attorney, Agent, or Firm* — Birch, Stewart, Kolasch & Birch, LLP

(57) ABSTRACT

A fan module is disposed with a fan mechanism having a fixing portion. The fixing portion has a first surface, a second surface, and a perforation passing through the first and the second surface, wherein the first surface and the second surface face opposite directions. A connector is disposed in the perforation and is electrically connected to a wire set which is adapted to transmit a signal or electric power. A shell of the connector includes a body for passing through the perforation and a protruding portion protruding away from a circumference of the body and abutting against the first surface of the fixing portion. The restricting member is detachably engaged with the fixing portion and the connector to clamp the protruding portion and the fixing portion by two restricting plates of the restricting member. With such design, the fan module could be installed to a site via the connector to achieve positioning and electrical connection once.

10 Claims, 7 Drawing Sheets

(56) References Cited

U.S. PATENT DOCUMENTS

| | | | | |
|---|---|---|---|---|
| 7,165,992 | B1 * | 1/2007 | Schiaffino | H01R 13/652 439/537 |
| 7,500,867 | B1 * | 3/2009 | Doglio | H01R 13/5841 439/456 |
| 7,537,481 | B2 * | 5/2009 | Sano | H05K 5/0073 439/527 |
| 7,753,722 | B2 * | 7/2010 | Simonse | H04R 1/06 439/351 |
| 8,052,484 | B1 * | 11/2011 | Salisbury | H01R 13/642 439/680 |
| 8,333,623 | B2 * | 12/2012 | Nickel | H01R 13/639 439/859 |
| 8,382,513 | B2 * | 2/2013 | Kobayashi | F24S 25/61 439/507 |
| 8,747,145 | B2 * | 6/2014 | Gossen | H01R 13/5812 439/460 |
| 9,331,421 | B2 * | 5/2016 | Lai | H01R 13/5202 |
| 10,208,874 | B2 * | 2/2019 | Geiger | H02S 30/00 |
| 11,336,064 | B2 * | 5/2022 | Miyazaki | H01R 24/40 |
| 2003/0148659 | A1 * | 8/2003 | Walker | H01R 13/6315 439/537 |
| 2005/0272306 | A1 * | 12/2005 | Kerr | H02G 3/20 439/537 |
| 2011/0199439 | A1 * | 8/2011 | Aoki | B41J 2/1753 347/85 |
| 2011/0223802 | A1 * | 9/2011 | Zeller | F16M 11/14 439/529 |
| 2016/0124464 | A1 * | 5/2016 | Raghunathan | H01R 31/065 361/752 |

* cited by examiner

FAN MODULE, ELECTRICAL DEVICE HAVING CONNECTOR RESTRICTING CONFIGURATION, AND A RESTRICTING FRAME

BACKGROUND OF THE INVENTION

Technical Field

The present disclosure relates generally to a configuration for restricting a connector, and more particularly to a fan module, an electrical device having connector restricting configuration, and a restricting frame.

Description of Related Art

When a conventional fan module or electrical device is installed to a predetermined location, a frame of the fan module or the electric machine needs to be fixed, and an additional connector for transmitting the signal and electrical power is inserted to the socket around the predetermined location to allow the fan module or the electric machine to be able to receive the power and control signal. Thus, the electrical device could be operated.

However, the fan module or the electrical device is fixed to the predetermined location by using screws or applying glue, so that during an installation process additional tools are needed for screwing up the screws or applying glue. Thus, the conventional installation process is complicated and waste more time. In further, there needs more time to detach screws or remove glue when the electrical device is in maintenance process.

BRIEF SUMMARY OF THE INVENTION

In view of the above, the primary objective of the present disclosure is to provide a fan module and/or an electrical device, wherein the connector could be detachably connected to a frame of the fan module and/or the electrical device via the restricting member, so that the connector could be simply and quickly fixed to a frame of the fan module, and the connector of the fan module could be inserted into a proper socket depending on the required demand.

The present disclosure provides a fan module including a fan mechanism, a wire set, a connector, and a restricting member. The fan mechanism has a fixing portion, wherein the fixing portion has a first surface, a second surface opposite to the first surface, and a perforation passing through the first surface and the second surface. The wire set is adapted to transmit an electronic signal to the fan mechanism. The connector includes a shell and a conductive terminal set disposed in the shell. The conductive terminal set is electrically connected to the wire set. The shell has a body and a protruding portion protruding away from at least a section of a circumference of the body. The body passes through the perforation, and the protruding portion abuts against the first surface of the fixing portion. The restricting member is detachably engaged with the fixing portion and the connector, wherein the restricting member comprises a first plate and a second plate that are opposite to each other. When the restricting member is engaged with the fixing portion and the connector, the first plate abuts against the protruding portion of the connector, and the second plate abuts against the second surface of the fixing portion.

The present disclosure provides an electrical device with a connector restricting configuration including a frame, an electric machine, a wire set, a connector, and a restricting member. The frame has a fixing portion, wherein the fixing portion has a first surface, a second surface opposite to the first surface, and a perforation passing through the first surface and the second surface. The electric machine disposed in the frame. The wire set is electrically connected to the electric machine for transmitting an electronic signal. The connector includes a shell and a conductive terminal set, wherein the conductive terminal set is disposed in the shell. The conductive terminal set is electrically connected to the wire set. The shell has a body and a protruding portion protruding away from at least a section of the circumference of the body. The body passes through the perforation. The protruding portion abuts against the first surface of the fixing portion. The restricting member is detachably engaged with the fixing portion and the connector, wherein the restricting member includes a first plate and a second plate that are opposite to each other. The first plate and the second plate clamp the protruding portion of the connector and the fixing portion.

The present disclosure further provides a restricting frame including a frame and a restricting member. The frame has a frame body and a fixing portion, wherein the fixing portion has a first surface, a second surface opposite to the first surface, and a perforation passing through the first surface and the second surface. The restricting member is movable relative to the frame between a first position and a second position and having a first plate and a second plate that are opposite to each other. When the restricting member is located at the second position, the fixing portion is clamped by the first plate and the second plate. At the time, the first plate faces to and is spaced from the first surface of the fixing portion, and the second plate abuts against the second surface of the fixing portion.

Since the connector is fixed to the fixing portion of the fan mechanism or the frame via the restricting member, the fan module or the frame with the electric machine could be installed to a site by simply inserting the connector of the fan module or the frame directly to the socket of the site. Thus, the fan mechanism or the electric machine could not only be fixed, but also be electrically connected to the site.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
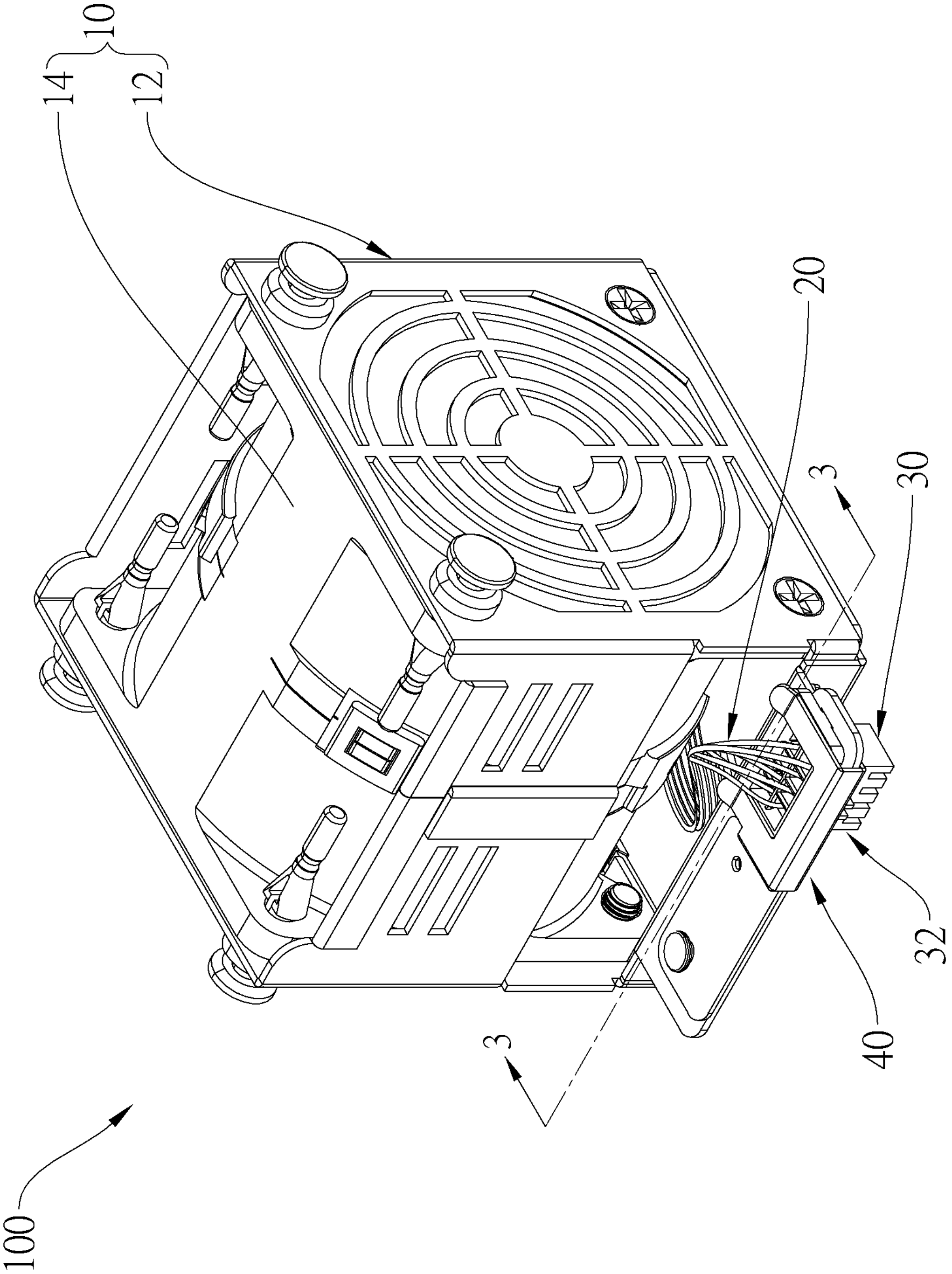
FIG. 1 is a perspective view of the fan module of a preferred embodiment according to the present disclosure.
Figure 2:
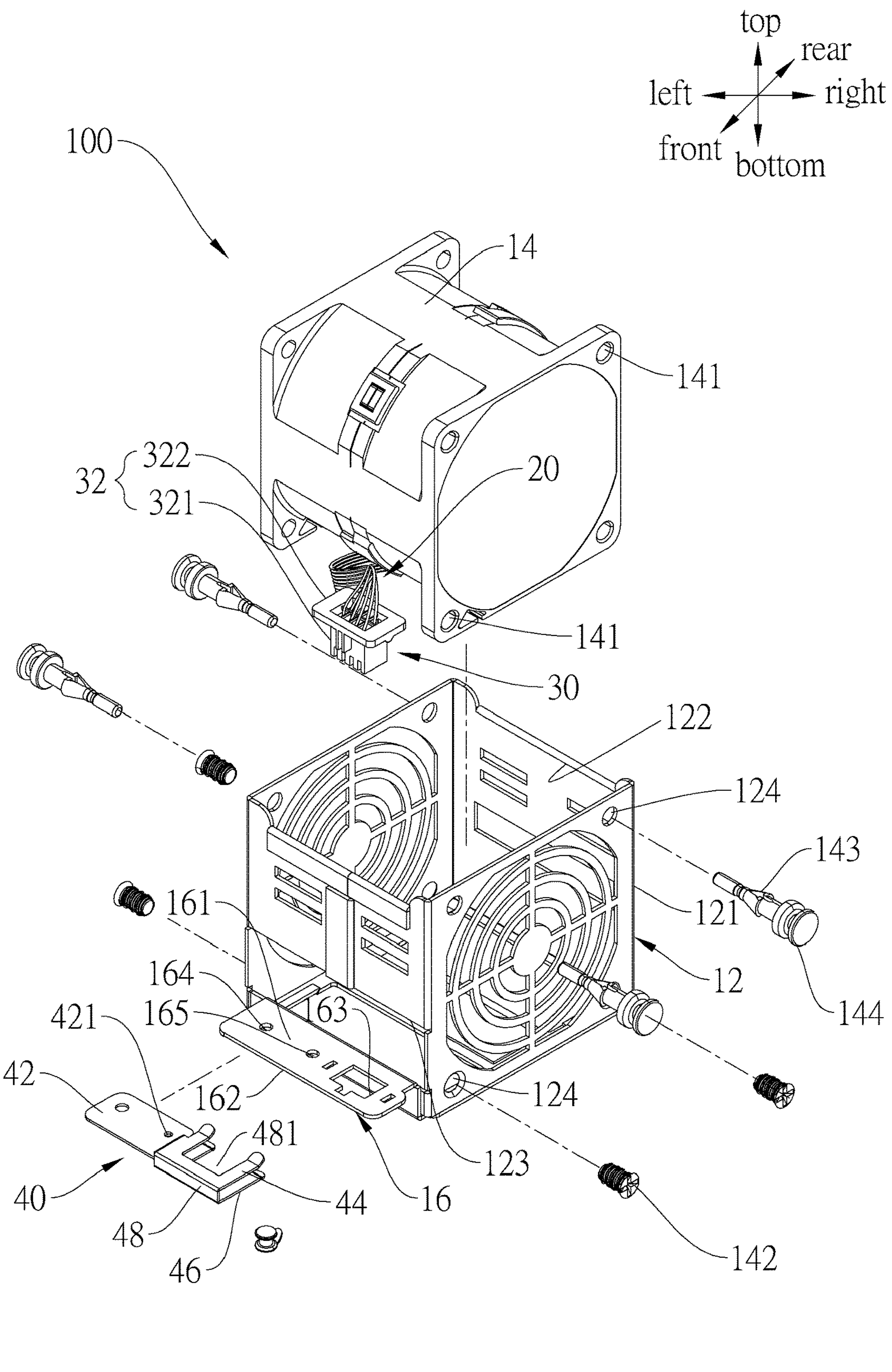
FIG. 2 is an exploded view of the fan module of the preferred embodiment according to the present disclosure.
Figure 3:
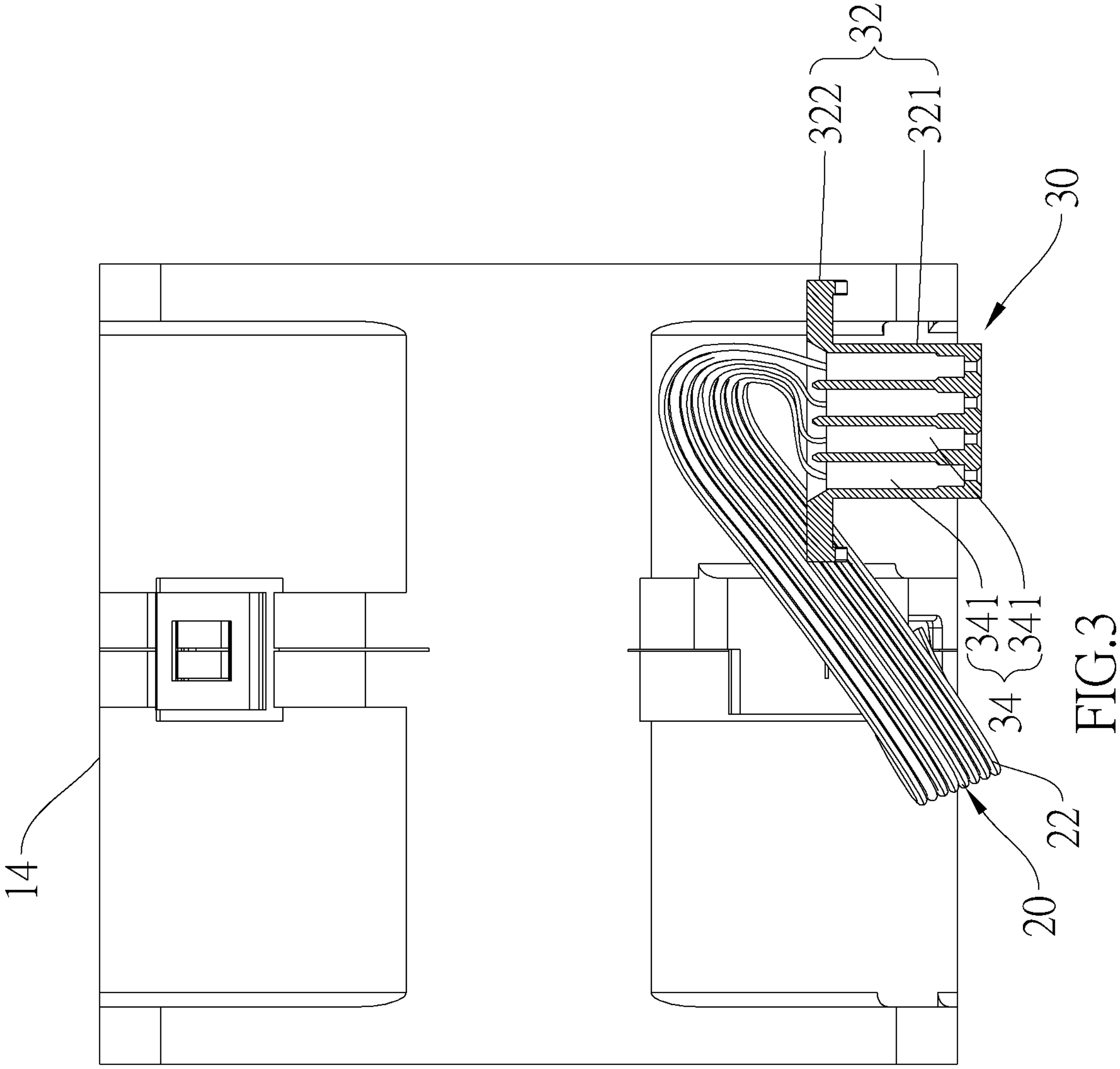
FIG. 3 is a sectional view taken along the 3-3 line in FIG. 1, showing the structure of the connector of the preferred embodiment according to the present disclosure.
Figure 4A:
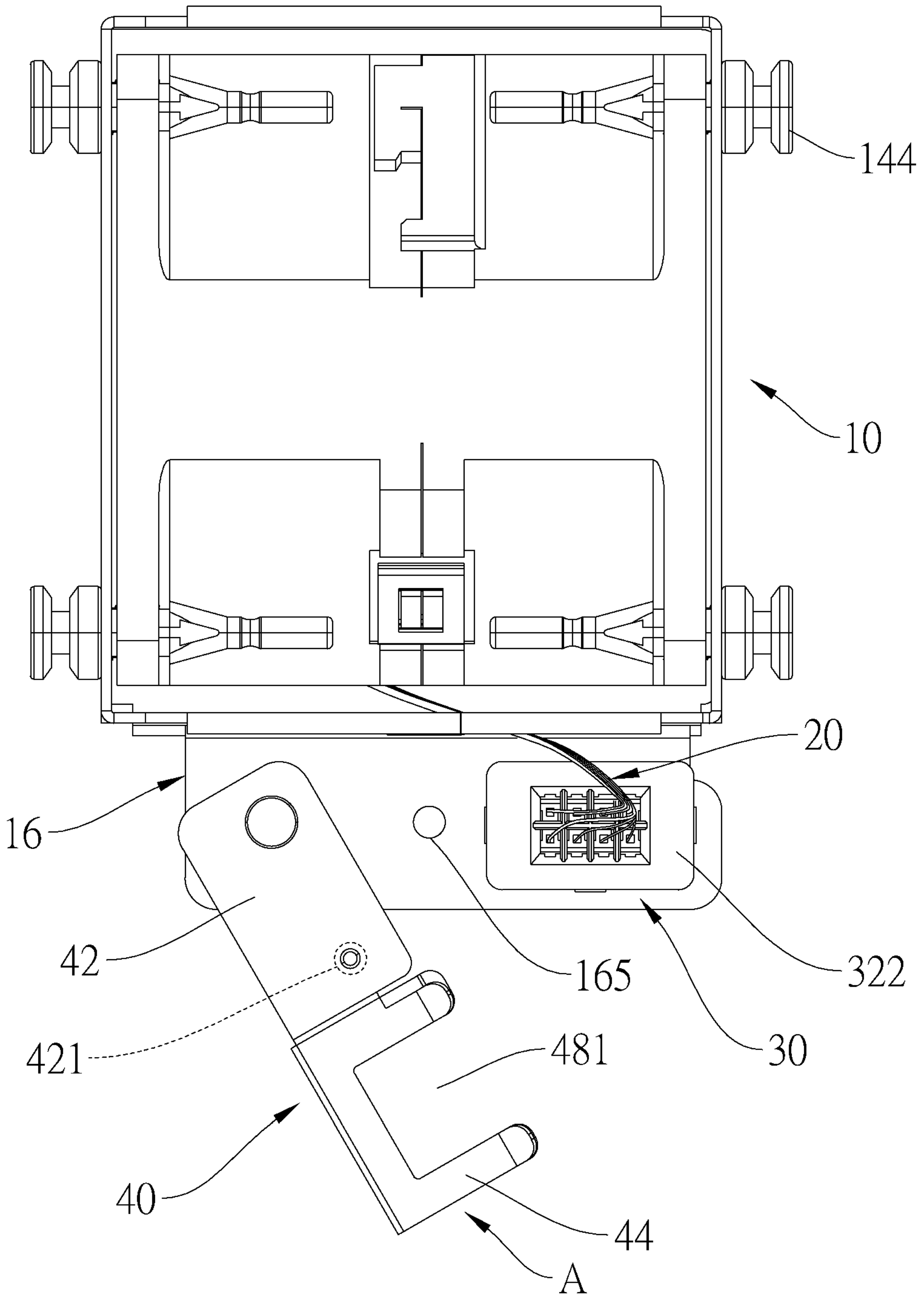
FIG. 4A is a top view of the fan module shown in FIG. 1, showing the restricting member of the fan module is located at the first position.
Figure 4B:
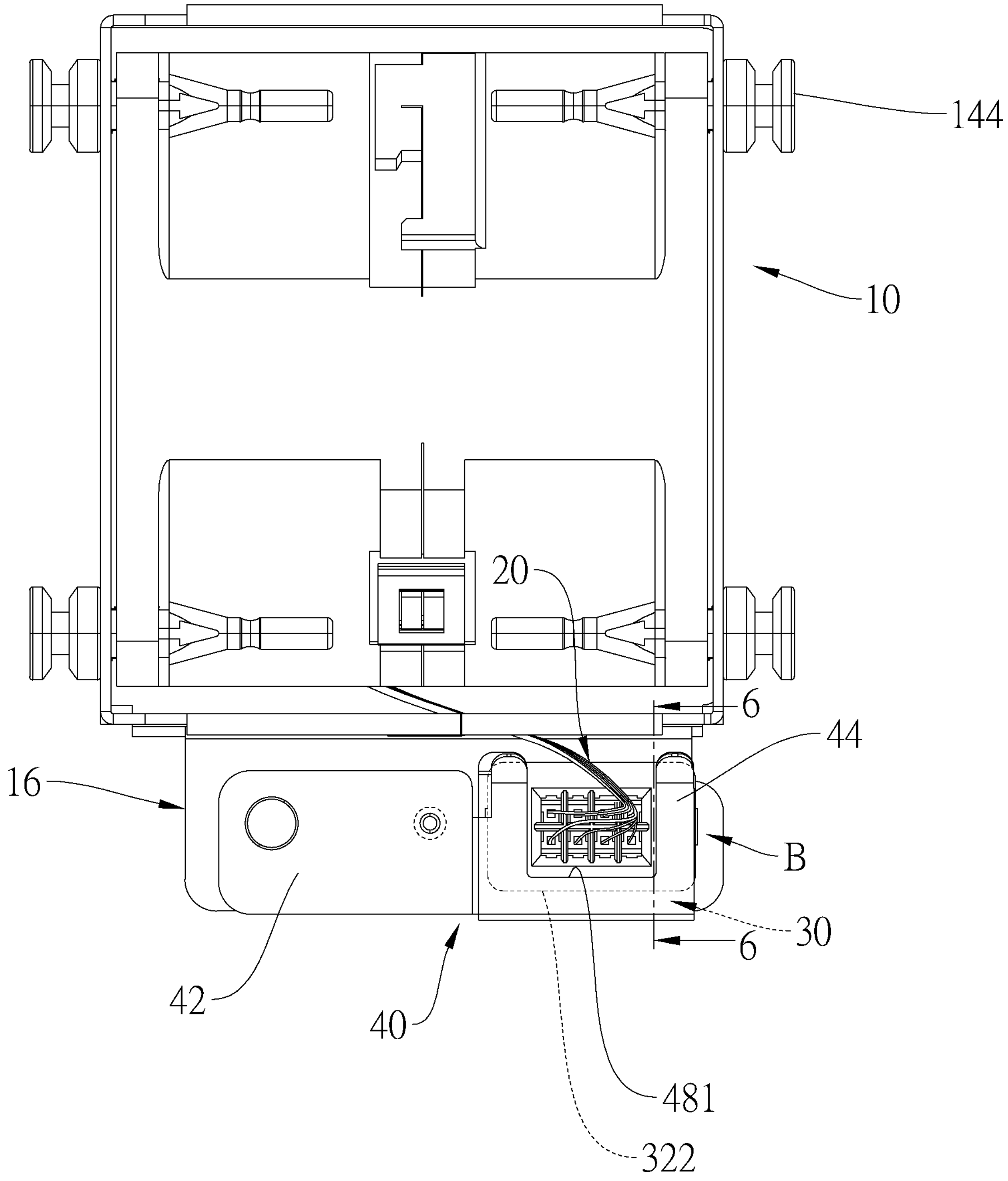
FIG. 4B is a top view of the fan module shown in FIG. 1, showing the restricting member of the fan module is located at the second position.
Figure 5:
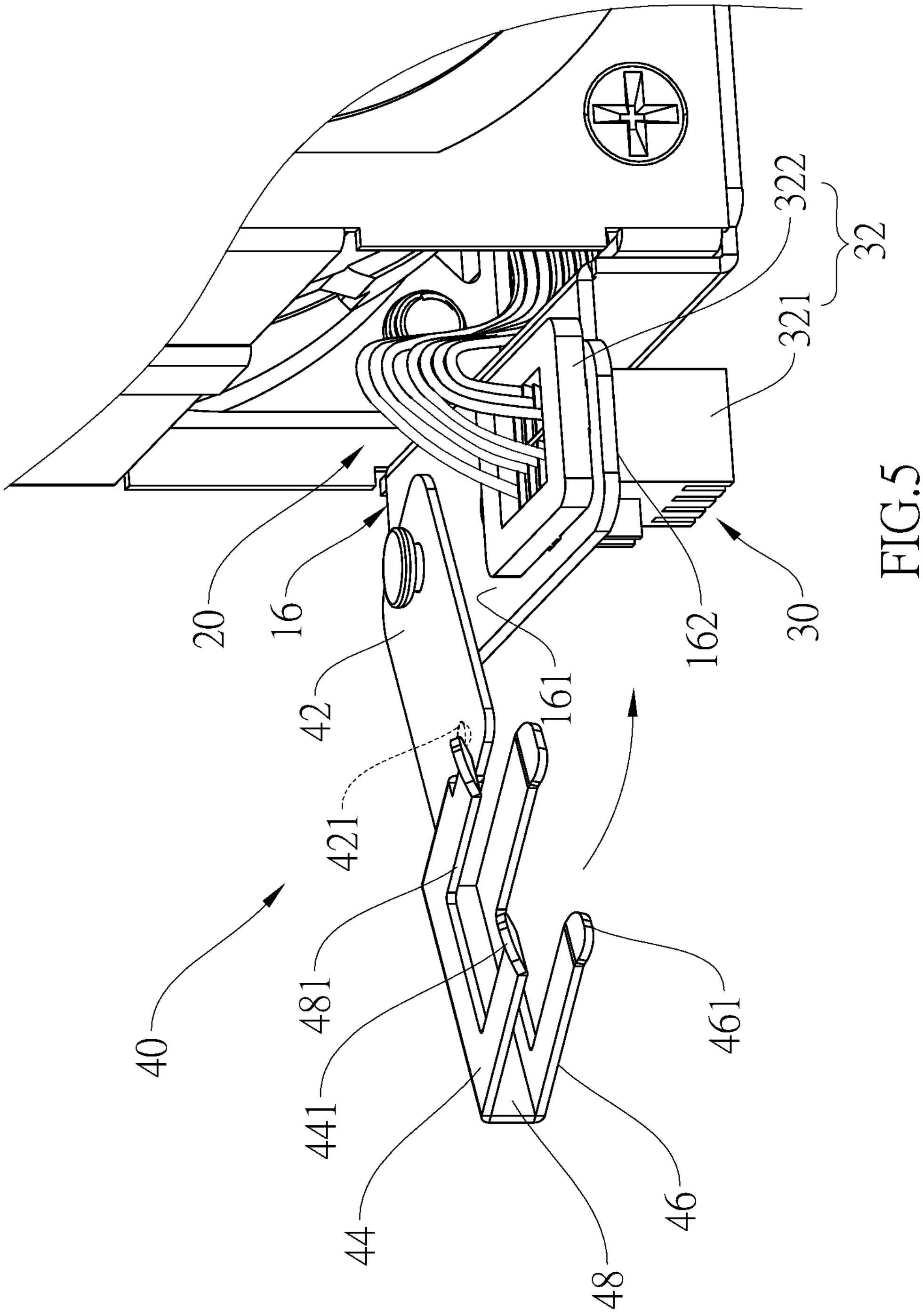
FIG. 5 is a schematic view of the fan module shown in FIG. 1, showing the restricting member of the fan module is moving from the first position to the second position to lock the connector; and, FIG. 6 is a sectional view taken along the 6-6 line in FIG. 4B, showing the relationship between the restricting member and the connector when the connector is fixed.
Figure 6:
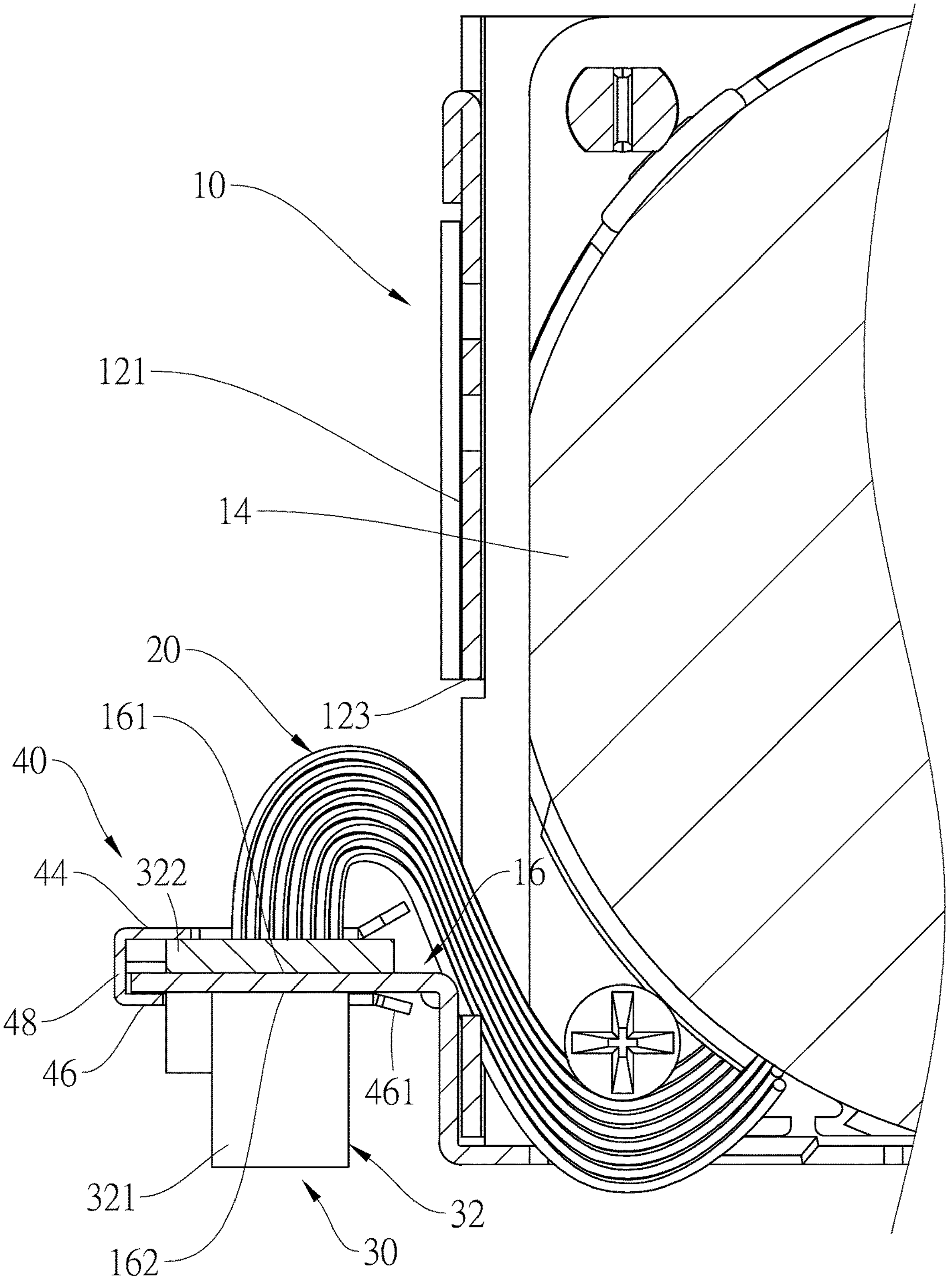

In the description below, the terms "top", "bottom", "front", "rear", "left", "right", and their derivatives, should be interpreted from the perspective views in the invention shown in FIG. 1 and FIG. 2. It is also understood that the terminology used herein is to describe particular embodiments only, and is not intended to limit the scope of the present disclosure.

As illustrated in FIG. 1 to FIG. 6, a fan module 100 of an embodiment according to the present disclosure includes a fan mechanism 10, a wire set 20, a connector 30, and a restricting member 40, wherein the wire set 20 is electrically connected to the connector 30, and the restricting member 40 is adapted to fix the connector 30 to the fan mechanism 10.

The fan mechanism 10 has a fixing portion 16, wherein the fixing portion 16 has a first surface 161 and a second surface 162 that face opposite directions. Additionally, the fixing portion 16 has a perforation 163 passing through the fixing portion 16. In the embodiment, the perforation 163 passes through the first surface 161 and the second surface 162.

The wire set 20 includes a plurality of wires 22. In present embodiment, the plurality of wires 22 are collected into a bundle. The wire set 20 is adapted to transmit the electronic signal to the fan mechanism 10. In the present embodiment, the electronic signal includes an electronic power or a control signal to the fan mechanism 10.

The connector 30 includes a shell 32 and a conductive terminal set 34, wherein the conductive terminal set 34 is disposed in the shell 32. The shell 32 has a body 321 and a protruding portion 322. The body 321 passes through the perforation 163 of the fixing portion 16. The conductive terminal set 34 is disposed in and passes through the body 321. The protruding portion 322 protrudes away from a circumference of the body 321 to form a flange. The protruding portion 322 abuts against the first surface 161 of the fixing portion 16 to position the connector 30. In other embodiment, the protruding portion 322 could protrude away from at least a section of the circumference of the body 321. The conductive terminal set 34 has a plurality of conductive terminals 341 that are embedded in the shell 32. The conductive terminal set 34 is electrically connected to the wire set 20, wherein each of the wires 22 is connected to one of the conductive terminals 341.

As illustrated in FIG. 4A to FIG. 6, the restricting member 40 is movable relative to the fan mechanism 10 between a first position A and a second position B. The restricting member 40 includes a first plate 44 and a second plate 46 that are opposite to each other. When the restricting member 40 is located at the second position B, the fixing portion 16 is clamped by the first plate 44 and the second plate 46. When the connector 30 is not inserted into the perforation 163 and the restricting member 40 is located at the second position B, the first plate 44 faces to and is spaced from the first surface 161 of the fixing portion 16, and the second plate 46 abuts against the second surface 162 of the fixing portion 16. When the connector 30 is inserted into the perforation 163 and the protruding portion 322 abutting against the first surface 161 of the fixing portion 16, the movement of the restricting member 40 between the first position A and the second position B could perform operation of unlock or lock the connector 30. In other words, when the restricting member 40 is located at the first position A, the connector 30 is unlocked and therefore be disengaged from the fixing portion 16. When the restricting member 40 is located at the first position B, the connector 30 is locked and therefore be engaged from the fixing portion 16. More specifically, the restricting member 40 clamps the protruding portion 322 of the connector 30 and the fixing portion 16 by the first plate 44 and the second plate 46, so that the connector 30 is restricted to be located within the perforation 163 and is prevented from moving up to leave the perforation 163. At this time, the first plate 44 of the restricting member 40 touches the protruding portion 322 of the connector 30, and the second plate 46 of the restricting member 40 touches the second surface 162 of the fixing portion 16.

Since the connector 30 electrically connected to the wire set 20 is restricted within the perforation 163 of the fixing portion 16 by the restricting member 40, the connector 30 on the fan mechanism 10 could be directly inserted into a corresponding socket when mounting the fan mechanism 10 to an object or article (such as a printed circuit board or a computer).

Additionally, the mean for locking the connector 30 by the restricting member 40 is clamping by the elastic pieces. With such design, the connector 30 could be fixed in the perforation 163 without using a tool. Thus, the connector 30 could be simply and quickly detached from and engaged with the socket, which facilitates the assembly and the maintenance of the fan mechanism 10.

The fan module 100 of the above-mentioned embodiment could be an electrical device having a structure for fixing the connector. The electrical device includes a frame 12 and an electric machine 14, wherein the frame 12 has said fixing portion 16 as mentioned above. The electric machine 14 is disposed in the frame 12 and is electrically connected to the wire set 20. Additionally, the electrical device is provided with a restricting configuration for fixing the connector 30 to the electrical device, wherein the connecter 30 is electrically connected to the wire set 20.

The restricting configuration includes the frame 12 and the restricting member 40. The frame 12 has the fixing portion 16, wherein the fixing portion 16 has the first surface 161 and the second surface 162 that face opposite directions. Additionally, the fixing portion 16 has the perforation 163 passing through the fixing portion 16, namely passing through the first surface 161 and the second surface 162. The restricting member 40 includes the first plate 44 and the second plate 46 that are opposite to each other. When the restricting member 40 is located at the second position B, the fixing portion 16 is clamped by the first plate 44 and the second plate 46, wherein the first plate 44 faces to and is spaced from the first surface 161 of the fixing portion 16, and the second plate 46 abuts against the second surface 162. When the restricting member 40 is located at the first position A, the fixing portion 16 leaves a space between the first plate 44 and the second plate 46.

The following further describes the frame 12, the electric machine 14, the fixing portion 16, the connector 30, and the restricting member 40 in detail. The frame 12 has a frame body 121 which is a cube or cuboid. As illustrated in FIG. 2, six sides of the frame body 121 are referred to as a front side, a rear side, a left side, a left side, a right side, a top side, and a bottom side in the following description, which is for illustrating purpose and is not intended to limit an assembly orientation of the electrical device. The top side of the frame body 121 has an opening 122 provided for the electric machine 14 to enter. The front side of the frame body 121 has a slot 123 at a bottom half portion, wherein the slot 123 is provided for the wires to pass through and is an elongated hole extending in a direction parallel to the bottom side of frame body 121. The fixing portion 16 is an elongated plate extending away from the front side of the frame body 121. The fixing portion 16 is connected to the front side of the frame body 121 at a bottom edge of the slot 123. In the current embodiment, the fixing portion 16 is perpendicular to the front side of the frame body 121. The left side of the frame body 121 has four positioning holes 124 at four corners, and the right side of the frame body 121 has four positioning holes 124 at four corners. Each of the positioning holes 124 is disposed at one of the corners of either the left side or the right side of the frame body 121.

The electric machine 14 is a cubic fan that is put into the frame 12 through the opening 122. A left side of the electric machine 14 has four engaging holes 141 at four corners corresponding to the positioning holes 124 on the left side of the frame body 121. A right side of the electric machine 14 has four engaging holes 141 at four corners corresponding to the positioning holes 124 on the right side of the frame body 121. A screw 142 as a fastener passes through each of the positioning holes 124 near to the bottom side to engage with corresponding one of the engaging holes 141 of the electric machine 14. A pin 143 as a fastener passes through each of the positioning holes 124 near to the top side to engage with corresponding one of the engaging holes 141 of the electric machine 14. An outer end of each of the pins 143 has a head 144 with a greater diameter. The heads 144 protrude from the left side or the right side of the frame body 121. The electric machine 14 is electrically connected to an end of the wire set 20, and the other end of the wire set 20 is electrically connected to the connector 30. The connector 30 and a part of the wire set 20 pass through the slot 123 of the frame 122.

The first surface 161 and the second surface 162 are a top surface and a bottom surface of the fixing portion 16, respectively. In the current embodiment, the perforation 163 is located at a right end portion of the fixing portion 16 where is near to the right side of the frame body 121, and a pivotally connecting portion 164 is located at a left end portion of the fixing portion 16 where is near to the left side of the frame body 121. In other embodiments, the perforation 163 could be located near to the left side of the frame body 121, and the pivotally connecting portion 164 could be located near to the right side of the frame body 121. A middle of the fixing portion 16 has a locking hole 165. The restricting member 40 has an extending plate 42, wherein the extending plate 42 is an elongated plate and an end of the elongated plate could be pivotally connected to the pivotally connecting portion 164. A middle of the extending plate 42 has a positioning member 421. The other end of the extending plate 42 is connected to either the first plate 44 or the second plate 46. A connecting plate 48 is connected to a front edge of the first plate 44 and a front edge of the second plate 46. The first plate 44 and the second plate 46 are recessed into a rear edge thereof to form a recess 481 corresponding to the perforation 163. When the restricting member 40 is located at the first position A, an opening of the recess 481 faces toward the fixing portion 16. The first plate 44 has two top guiding portions 441 on the right and the left of the recess 481, respectively, wherein the top guiding portions 441 extend backward and upward. The second plate 46 has two bottom guiding portions 461 on the right and the left of the recess 481, respectively, wherein the bottom guiding portions 461 extend backward and downward.

The body 321 of the connector 30 passes through the perforation 163. The protruding portion 322 protrudes from a top half of the circumference of the body 321 to form a flange, wherein the protruding portion 322 abuts against the first surface 161 around the perforation 163. The wire set 20 is inserted through a top end of the body 321 and is engaged with the conductive terminal set 34 in the body 321.

When the restricting member 40 is pivotally rotated about the pivotally connecting portion 164 to move away from the fixing portion 16, the restricting member 40 is located at the first position A. When the restricting member 40 is pivotally rotated about the pivotally connecting portion 164 to allow the extending plate 42 to overlap with the fixing portion 16, the restricting member 40 is located at the second position B. When the restricting member 40 is located at the second position B, the positioning member 421 of the extending plate 42 is engaged with the locking hole 165 of the fixing portion 16 to position the extending plate 42. The perforation 163 and the body 321 of the connector 30 are located within the recess 481. The wire set 20 passes through a top side of the recess 481, and the body 321 passes through a bottom side of the recess 481. The protruding portion 322 of the connector 30 is clamped by a portion of the first plate 44 around the recess 481 and the first surface 161 of the fixing portion 16. A portion of the second plate 46 around the recess 481 abuts against the second surface 162 of the fixing portion 16 以該 recess 481. With such design, after the body 321 of the connector 30 is inserted into the perforation 163, the restricting member 40 could restrict the connector 30 from withdrawing from the perforation 163.

It must be pointed out that the embodiment described above is only a preferred embodiment of the present disclosure. All equivalent structures which employ the concepts disclosed in this specification and the appended claims should fall within the scope of the present disclosure.

What is claimed is:

1. A fan module, comprising:

a fan mechanism having a fixing portion, wherein the fixing portion has a first surface, a second surface opposite to the first surface, and a perforation passing through the first surface and the second surface;

a wire set adapted to transmit an electronic signal to the fan mechanism;

a connector comprising a shell and a conductive terminal set disposed in the shell, wherein the conductive terminal set is electrically connected to the wire set; the shell has a body and a protruding portion protruding away from at least a section of a circumference of the body; the body passes through the perforation, and the protruding portion abuts against the first surface of the fixing portion; and a restricting member detachably engaged with the fixing portion and the connector, wherein the restricting member comprises a first plate and a second plate that are opposite to each other; when the restricting member is engaged with the fixing portion and the connector, the first plate abuts against the protruding portion of the connector, and the second plate abuts against the second surface of the fixing portion.

2. The fan module as claimed in claim 1, wherein the fixing portion has a pivotally connecting portion; the restricting member has an extending plate; an end of the extending plate is pivotally connected to the pivotally connecting portion; the other end of the extending plate is connected to either the first plate or the second plate; a connecting plate is connected between an edge of the first plate and an edge of the second plate.

3. The fan module as claimed in claim 2, wherein the first plate and the second plate are recessed into an edge thereof to form a recess; an opening of the recess faces toward the fixing portion; the wire set passes through a top side of the recess, and the body passes through a bottom side of the recess; a portion around the recess of the first plate abuts against the protruding portion of the connector, and a portion around the recess of the second plate abuts against the second surface of the fixing portion.

4. The fan module as claimed in claim 3, wherein the first plate has two top guiding portions on the right and the left of the recess, respectively, wherein the top guiding portions extend upward and toward the fixing portion; the second plate has two bottom guiding portions on the right and the left of the recess, respectively, wherein the bottom guiding portions extend downward and toward the fixing portion.

5. The fan module as claimed in claim 2, wherein the fixing portion has a locking hole around middle thereof, and the extending plate has a positioning member around middle thereof; the positioning member of the extending plate is engaged with the locking hole of the fixing portion to position the extending plate.

6. An electrical device with a connector restricting configuration, comprising:

a frame having a fixing portion, wherein the fixing portion has a first surface, a second surface opposite to the first surface, and a perforation passing through the first surface and the second surface;

an electric machine disposed in the frame;

a wire set electrically connected to the electric machine for transmitting an electronic signal;

a connector comprising a shell and a conductive terminal set disposed in the shell, wherein the conductive terminal set is electrically connected to the wire set; the shell has a body and a protruding portion protruding away from at least a section of a circumference of the body; the body passes through the perforation, and the protruding portion abuts against the first surface of the fixing portion;

a restricting member detachably engaged with the fixing portion and the connector, wherein the restricting member comprises a first plate and a second plate that are opposite to each other; the first plate and the second plate clamp the protruding portion of the connector and the fixing portion.

7. The electrical device with connector restricting configuration as claimed in claim 6, wherein the frame has a frame body; a side of the frame body has an opening provided for the electric machine to enter; the electric machine is put into the frame through the opening; another end of the frame body has a slot for wires to pass through; the wire set passes through the slot; the fixing portion extends outward from an edge of the slot.

8. The electrical device with connector restricting configuration as claimed in claim 7, wherein the frame body is cubic, and the opening for the electric machine to enter is disposed on a top side of the frame body; a left side of the frame body has four positioning holes at four corners, and the right side of the frame body has four positioning holes at four corners; the electric machine is cubic; a left side of the electric machine has four engaging holes at four corners corresponding to the positioning holes on the left side of the frame body; a right side of the electric machine has four engaging holes at four corners corresponding to the positioning holes on the right side of the frame body; a fastener is disposed to one of the engaging holes, wherein each of the fasteners passes through one of the positioning holes to be engaged with a corresponding one of the engaging holes, thereby fixing the electric machine in the frame.

9. The electrical device with connector restricting configuration as claimed in claim 8, wherein the fasteners near to the top side of the frame body are pins, and an outer end of each of the pins has a head protruding away from a surface of the frame body.

10. The electrical device with connector restricting configuration as claimed in claim 8, wherein the electric machine is a fan.

* * * * *